United States Patent
Fukuhara (10) Patent No.: US 9,971,272 B2
(45) Date of Patent: May 15, 2018

(54) OPTICAL SCANNING DEVICE AND IMAGE FORMING APPARATUS

(71) Applicant: CANON KABUSHIKI KAISHA, Tokyo (JP)

(72) Inventor: Hiroyuki Fukuhara, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/325,996

(22) PCT Filed: Jul. 22, 2015

(86) PCT No.: PCT/JP2015/003674
§ 371 (c)(1),
(2) Date: Jan. 12, 2017

(87) PCT Pub. No.: WO2016/017116
PCT Pub. Date: Feb. 4, 2016

(65) Prior Publication Data
US 2017/0153570 A1    Jun. 1, 2017

(30) Foreign Application Priority Data
Jul. 31, 2014 (JP) .................................. 2014-156454

(51) Int. Cl.
*G03G 15/00* (2006.01)
*G03G 15/04* (2006.01)
(Continued)

(52) U.S. Cl.
CPC ..... *G03G 15/04036* (2013.01); *G02B 26/123* (2013.01); *G02B 26/125* (2013.01); *H04N 1/113* (2013.01)

(58) Field of Classification Search
CPC .. G02B 26/123; G02B 26/125; G02B 26/124; G02B 26/126
(Continued)

(56) References Cited

U.S. PATENT DOCUMENTS

2005/0259307 A1* 11/2005 Takayama ................ B41J 2/473
359/204.1
2011/0063704 A1* 3/2011 Miyatake ............ G02B 26/123
359/204.1
(Continued)

FOREIGN PATENT DOCUMENTS

JP    2004-205640 A    7/2004
JP    2005-250190 A    9/2005
(Continued)

*Primary Examiner* — Walter L Lindsay, Jr.
*Assistant Examiner* — Jessica L Eley
(74) *Attorney, Agent, or Firm* — Canon USA Inc., IP Division (57) ABSTRACT

The present invention relates to an optical scanning device and an image forming apparatus. In order to suppress jitter, the degree of convergence of a first incident optical system and the degree of convergence of a second incident optical system are both equal to or greater than 0, and the degree of convergence of the second incident optical system is greater than the degree of convergence of the first incident optical system. An angle of incidence, within a sub-scanning section, of a light beam incident on a deflection surface of an optical deflector from the second incident optical system is less than an angle of incidence, within the sub-scanning section, of a light beam incident on the deflection surface of the optical deflector from the first incident optical system.

6 Claims, 6 Drawing Sheets

(51) Int. Cl.
 *G02B 26/12* (2006.01)
 *H04N 1/113* (2006.01)
(58) Field of Classification Search
 USPC .................................................... 358/204.1
 See application file for complete search history.

(56) References Cited

U.S. PATENT DOCUMENTS

| | | | |
|---|---|---|---|
| 2012/0236380 A1* | 9/2012 | Miyatake | ............... B29D 11/00 |
| | | | 359/204.1 |
| 2013/0147895 A1* | 6/2013 | Miyatake | ......... G03G 15/04036 |
| | | | 347/224 |
| 2013/0201536 A1* | 8/2013 | Nakamura | ............... H04N 1/04 |
| | | | 358/475 |

FOREIGN PATENT DOCUMENTS

| | | |
|---|---|---|
| JP | 2006-178190 A | 7/2006 |
| JP | 2007-240608 A | 9/2007 |
| JP | 2009-92915 A | 4/2009 |
| JP | 2010-072049 A | 4/2010 |
| JP | 2010-217312 A | 9/2010 |
| JP | 2011-064717 A | 3/2011 |
| JP | 2013-250370 A | 12/2013 |

* cited by examiner

OPTICAL SCANNING DEVICE AND IMAGE FORMING APPARATUS

TECHNICAL FIELD

The present invention relates to optical scanning devices configured to deflect a laser beam from a light source and expose an image carrier with the deflected laser beam and to image forming apparatuses that include such optical scanning devices.

BACKGROUND ART

An electrophotographic image forming apparatus, such as a laser printer and a digital copier, includes an optical scanning device configured to deflect a laser beam from a light source by using an optical deflector and expose an image carrier to the deflected laser beam. A color image forming apparatus includes a plurality of scanning optical systems corresponding to respective colors. To reduce the size of such an image forming apparatus, a technique in which a plurality of laser beams are made incident on a single optical deflector is employed (refer to PTL 1). In this case, in order to reduce the thickness of the optical deflector and to make it easier to separate the deflected light beams, the light beams are typically made incident on a deflection surface of the optical deflector at an angle to the sub-scanning direction. In addition, in consideration of the cost, the optical path lengths of the respective scanning optical systems are typically set to be equal to one another so that identical optical components can be used in the respective scanning optical systems. However, in order to set the optical path lengths of the respective scanning optical systems to be equal to one another, a scanning optical system disposed close to the optical deflector needs a plurality of reflection mirrors. When a reflection mirror is used, lines are likely to appear in an image due to dust or scratches on the mirror surface, and banding of scanning lines arising due to vibration of the mirror becomes an issue. Furthermore, as the number of mirrors increases, the configuration of the apparatus as a whole becomes more complex. Therefore, it is desirable that the optical scanning device be configured such that the number of reflection mirrors is kept to a minimum. Another technique is known, in which, even when the optical path lengths of respective scanning optical systems vary as the number of reflection mirrors is kept to a minimum, the degree of convergence of light beams incident on an optical deflector is varied, such that the size of the apparatus is reduced (refer to PTL 2).

CITATION LIST

Patent Literature

PTL 1: Japanese Patent Laid-Open No. 2004-205640
PTL 2: Japanese Patent Laid-Open No. 2009-92915

SUMMARY OF INVENTION

Technical Problem

In the technique disclosed in PTL 2, with regard to a light beam that is to scan a surface disposed at a position farthest from the optical deflector, a substantially parallel light beam from a light source is made incident on the optical deflector. Meanwhile, with regard to a light beam that is to scan a surface disposed at a position closest to the optical deflector, a convergent light beam from a light source is made incident on the optical deflector. These light beams are both incident obliquely on the deflection surface of the optical deflector from an upper side and a lower side.

When a light beam is made incident obliquely on the deflection surface of the optical deflector, due to a relative inclination of the deflection surface (face tangle error) in the sub-scanning direction, a scanning position shift (jitter) in the main scanning direction increases geometrically in particular at a side where writing of an image ends. In addition, when a convergent light beam is made incident on the deflection surface, jitter occurs in a similar manner due to the face eccentricity or the like of the deflection surface. Thus, in a scanning optical system in which a convergent light beam is made incident obliquely on a deflection surface, the above-described two types of jitter are superposed on each other, which leads to a problem in that high jitter is likely to occur.

The present invention provides an optical scanning device and an image forming apparatus that are configured to suppress jitter.

Solution to Problem

An optical scanning device according to an aspect of the present invention includes
a first light source;
a first incident optical system provided so as to correspond to a first light beam emitted by the first light source;
a second light source;
a second incident optical system provided so as to correspond to a second light beam emitted by the second light source;
an optical deflector disposed such that the first light beam from the first incident optical system and the second light beam from the second incident optical system are incident on the optical deflector;
a first imaging optical system configured to image the first light beam deflected by the optical deflector on a first surface to be scanned; and
a second imaging optical system configured to image the second light beam deflected by the optical deflector on a second surface to be scanned,
wherein,
when a degree of convergence is expressed as $\{1-(Sk \div f)\}$ in which Sk represents distance, within a main scanning section, from a rear principal plane of the first or second imaging optical system to the corresponding first or second surface to be scanned, and f represents focal length of the first or second imaging optical system within the main scanning section,
the degree of convergence of the first incident optical system and the degree of convergence of the second incident optical system are both equal to or greater than 0, and the degree of convergence of the second incident optical system is greater than the degree of convergence of the first incident optical system, and
wherein an angle of incidence, within a sub-scanning section, of the second light beam incident on a deflection surface of the optical deflector from the second incident optical system is less than an angle of incidence, within the sub-scanning section, of the first light beam incident on the deflection surface of the optical deflector from the first incident optical system.

The main scanning section as used herein corresponds to a plane that contains an optical axis of a scanning optical system and a main scanning direction, and the sub-scanning section corresponds to a section that contains the optical axis of the scanning optical system and is orthogonal to the main scanning section. In addition, the main scanning direction corresponds to a direction in which a light beam is deflected by the optical deflector, and the sub-scanning direction corresponds to a direction orthogonal to the main scanning direction.

An image forming apparatus according to another aspect of the present invention includes
the optical scanning device, and
an image forming unit configured to scan a surface to be scanned on an image carrier with the optical scanning device and to form an image on a recording material on the basis of a scanned image.

Further features of the present invention will become apparent from the following description of exemplary embodiments with reference to the attached drawings.

Advantageous Effects of Invention

According to exemplary embodiments of the present invention, jitter can be suppressed.

DESCRIPTION OF EMBODIMENTS

Hereinafter, exemplary embodiments for implementing the present invention will be described in detail with reference to the drawings. It is to be noted that the dimensions, the materials, the shapes, and so forth of components described in the exemplary embodiments and the relative arrangement of the components do not limit the scope of the present invention, unless otherwise indicated in specific terms.

First Exemplary Embodiment

Image Forming Apparatus

Figure 6:
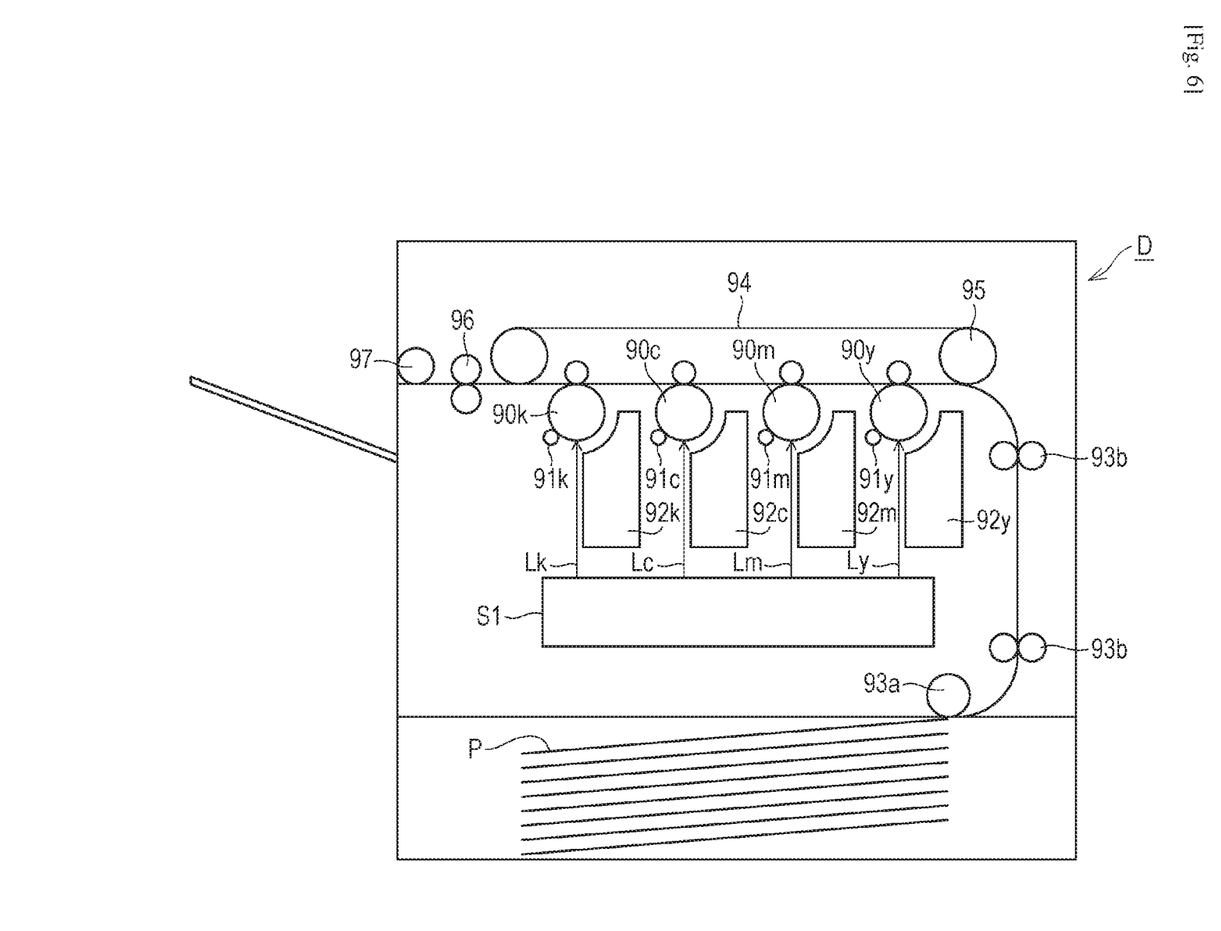
FIG. 6 schematically illustrates a configuration of a color image forming apparatus that includes an optical scanning device.

Referring to FIG. 6, a configuration of a color image forming apparatus D, to which an optical scanning device S1 according to the present exemplary embodiment can be applied, will be described. FIG. 6 schematically illustrates the configuration of the color image forming apparatus D that includes the optical scanning device S1. Of the reference characters indicated in the drawings, "k", "c", "m", and "y" following the numbers are indices indicating that those reference characters with such indices are for forming black, cyan, magenta, and yellow toner images, respectively. In the following description, these indices are omitted as appropriate.

An image forming process will be briefly described. The surface of each of the photosensitive members (image carriers) 90 is uniformly charged by respective primary chargers 91. Light beams (laser light beams) L that have been optically modulated on the basis of image information are transmitted by the optical scanning device S1. The surfaces of the photosensitive members 90, which serve as the image carriers, are illuminated with the respective light beams L, and electrostatic latent images are formed on the surfaces. The electrostatic latent images formed on the surfaces of the photosensitive members 90 are developed into toner images of black, cyan, magenta, and yellow by developing units 92. Meanwhile, a recording material P stacked on a feed tray is fed by feed rollers 93a and 93b and conveyed to nip portions between a transfer belt 94 and the photosensitive members 90. The developed toner images of the respective colors are transferred to the recording material P at the respective nip portions, and a color image is thus formed. A drive roller 95, which is connected to a drive motor (not illustrated) with low rotational fluctuation, feeds the transfer belt 94 in a precise manner. The color image formed on the recording material P is thermally fused by a fuser 96 and then discharged to the outside of the image forming apparatus D by a discharge roller 97. The photosensitive members 90, the primary chargers 91, the developing units 92, the transfer belt 94, and the fuser 96 are primary members constituting an image forming unit.

Optical Scanning Device

Subsequently, the optical scanning device S1 according to the present exemplary embodiment will be described with reference to FIGS. 1 to 3. In the following description, the optical axis of an imaging optical system (scanning optical system) corresponds to an axis that passes through the center (center image height) of a scanning region on a surface to be scanned. In addition, the optical axis of a lens corresponds to a straight light connecting the face vertices of an entry surface and an emission surface of the lens.

Figure 1:
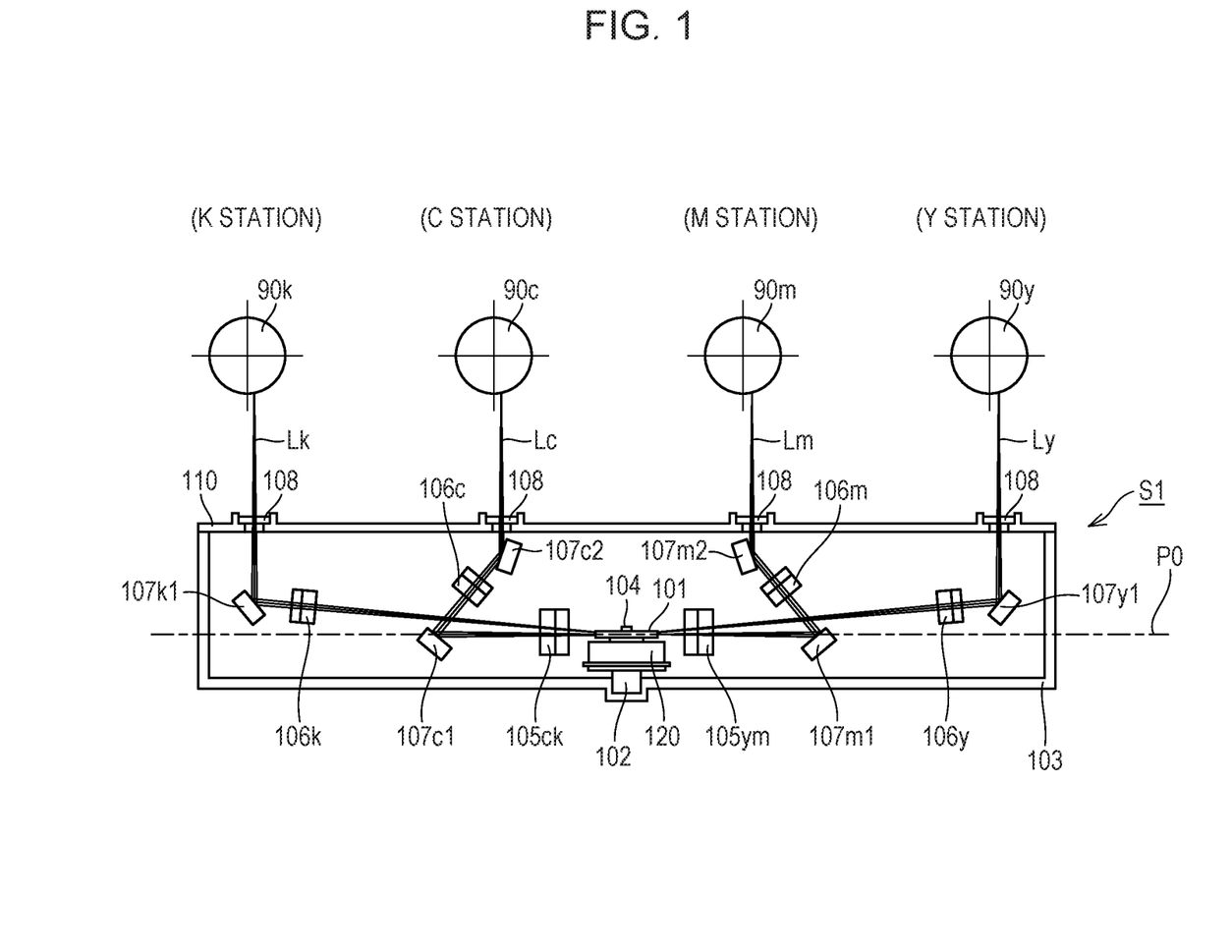
FIG. 1 is a sectional view of a primary portion of an optical scanning device, taken within the sub-scanning direction, according to a first exemplary embodiment.

FIG. 1 is a sectional view (sub-scanning section) of a primary portion of the optical scanning device S1 according to the present exemplary embodiment. The optical scanning device S1 according to the present exemplary embodiment is a unit to be provided in a color image forming apparatus of a tandem system, and is fixed to a frame of the above-described image forming apparatus by fixing members, such as springs and screws (not illustrated), and so on. In the following description, scanning optical systems corresponding to the respective colors are referred to as a K station, a C station, an M station, and a Y station, for convenience.

In the optical scanning device S1, an optical deflector 102 provided with a rotatable polygon mirror 101 is disposed at substantially the center of a housing member 103 having a substantially rectangular parallelpiped shape. A first scanning optical system (Y station and M station) is provided on one side (right side in FIG. 1) of a rotation shaft 104 of the optical deflector 102, and a second scanning optical system (C station and K station) is provided Oil the other side (left side in FIG. 1) of the rotation shaft 104. The first scanning optical system and the second scanning optical system have similar configurations. The configurations of the Y station and the K station are substantially symmetrical with respect to the center of the rotation shaft 104 of the optical deflector 102, and the configurations of the M station and the C station are substantially symmetrical with respect to the center of the rotation shaft 104.

The first scanning optical system includes a first scan lens 105*ym*, second scan lenses 106*y* and 106*m*, and redirecting mirrors 107*y*1, 107*m*1, and 107*m*2. In a similar manner, the second scanning optical system includes a first scan lens 105*ck*, second scan lenses 106*c* and 106*k*, and redirecting mirrors 107*c*1, 107*c*2, and 107*k*1. The first scanning optical system and the second scanning optical system each scan two separate light beams. The various parts of optical components constituting the first scanning optical system and the arrangement and optical effect of these optical components are basically identical to the various parts of optical components constituting the second scanning optical system and the arrangement and optical effect of these optical components. Therefore, primarily the first scanning optical system will be described hereinafter, and description of the second scanning optical system will be omitted as appropriate.

The first scan lens 105*ym* is shared by the Y station and the M station, and the second scan lenses 106*y* and 106*m* are provided, respectively, in the Y station and the M station. The second scan lenses 106*y* and 106*m* have different focal lengths. These optical components are housed in the housing member 103, which is formed of a glass-reinforced resin or the like and is tightly sealed by a lid 110 having emission ports covered by respective dustproof glasses 108. In the Y station, a light beam Ly, which has been deflected by the optical deflector 102 provided with the rotatable polygon mirror 101, passes through the first scan lens 105*ym* and the second scan lens 106*y* and is then guided to a photosensitive member 90*y* by the redirecting mirror 107*y*1, which is a plane mirror, to scan the photosensitive member 90*y*. In the M station, a light beam Lm, which has been deflected by the optical deflector 102 provided with the rotatable polygon mirror 101, passes through the first scan lens 105*ym*. Then, the light beam Lm is redirected by the redirecting mirror 107*m*1, passes through the second scan lens 106*m*, and is guided to a photosensitive member 90*m* by the redirecting mirror 107*m*2 to scan the photosensitive member 90*m*.

Figure 2A:
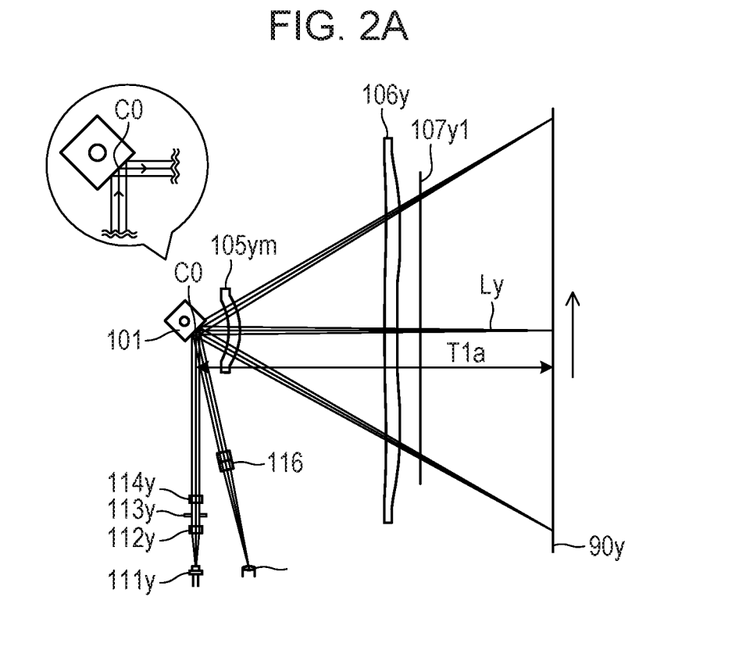
FIG. 2A is a sectional view of a primary portion of the optical scanning device, taken within the main scanning direction, according to the first exemplary embodiment.
Figure 2B:
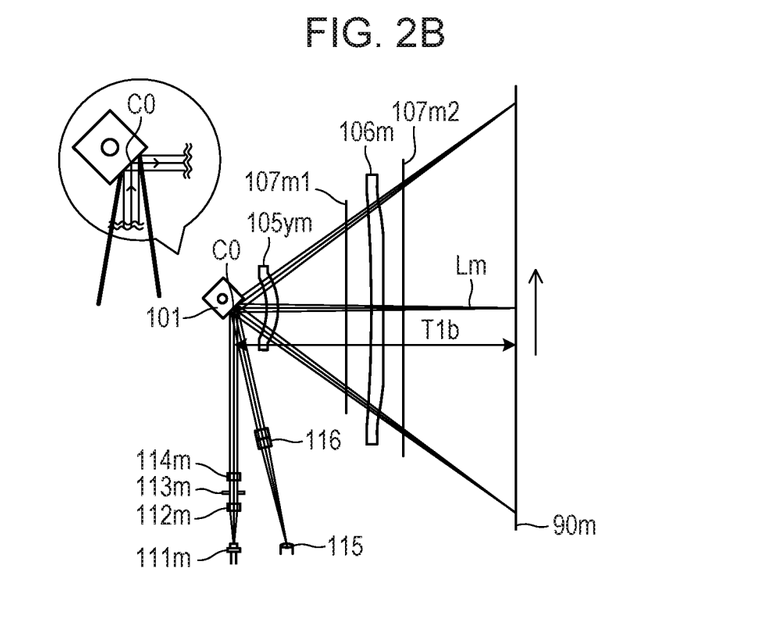
FIG. 2B is another sectional view of a primary portion of the optical scanning device, taken within the main scanning direction, according to the first exemplary embodiment.

FIGS. 2A and 2B are sectional views (main scanning sections) of a primary portion of the optical scanning device according to the present exemplary embodiment. FIG. 2A is a main scanning section of the station in the first scanning optical system. In FIG. 2A, C0 corresponds to a deflection point (reference point) of a principal ray of an on-axis light beam. The deflection point C0 is the reference point of the imaging optical system, and the distance from the deflection point C0 to the surface to be scanned is referred to as the optical path length of the imaging optical system, hereinafter.

The first incident optical system and the first imaging optical system will be described. The first incident optical system is constituted by a plurality of optical components provided so as to correspond to a light beam (first light beam) emitted by a first light source. The first imaging optical system is provided so as to correspond to a light beam obtained as a light beam from the first incident optical system is deflected by the optical deflector 102, and is constituted by a plurality of optical components that image the light beam on a first surface to be scanned. In the present exemplary embodiment, the first incident optical system and the first imaging optical system are provided in each of the Y station and the K station. The Y station and the K station have similar configurations, and thus only the Y station will be described, hereinafter. The light beam Ly emitted by a semiconductor laser 111*y*, which serves as the first light source, is substantially collimated by a collimator lens 112*y*, has its quantity regulated by an aperture stop 113*y*, and is incident on a cylindrical lens 114*y*. The substantially parallel light beam incident on the cylindrical lens 114*y* is transmitted by the cylindrical lens 114 with its state of being a parallel light beam retained within the main scanning section and is deflected by the optical deflector 102 provided with the rotatable polygon mirror 101. The collimator lens 112*y*, the aperture stop 113*y*, and the cylindrical lens 114*y* are the optical components that constitute the first incident optical system. The light beam Ly, which has been deflected by the optical deflector 102, then passes through the first scan lens 105*ym* and the second scan lens 106*y* and is reflected by the redirecting mirror 107*y*1 to thus scan the photosensitive member 90*y* at uniform velocity while being imaged thereon. The first scan lens 105*ym*, the second scan lens 106*y*, and the redirecting mirror 107*y*1 are the optical components that constitute the first imaging optical system. The surface of the photosensitive member 90*y* corresponds to the first surface to be scanned.

The second incident optical system and the second imaging optical system will be described. The second incident optical system is constituted by a plurality of optical components provided so as to correspond to a light beam (second light beam) emitted by a second light source. The second imaging optical system is provided so as to correspond to a light beam obtained as a light beam from the second incident optical system is deflected by the optical deflector 102 and is constituted by a plurality of optical components that image a light beam on a second surface to be scanned. In the present exemplary embodiment, the second incident optical system and the second imaging optical system are provided in each of the M station and the C station. The M station and the C station have similar configurations, and thus only the M station will be described, hereinafter. FIG. 2B is a main scanning section of the M station in the first scanning optical system. The light beam emitted by a semiconductor laser 111*m*, which serves as the second light source, is converged by a collimator lens 112*m*, has its quantity regulated by an aperture stop 113*m*, and is incident on a cylindrical lens 114*m*. The converging light beam incident on the cylindrical lens 114*m* is transmitted by the cylindrical lens 114*m* as a converging light beam within the main scanning section toward the rotatable polygon mirror 101 and is deflected by the optical deflector 102 provided with the rotatable polygon mirror 101. The collimator lens 112*m*, the aperture stop 113*m*, and the cylindrical lens 114*m* are the optical components that constitute the second incident optical system. The light beam Lm, which has been deflected by the optical deflector 102, then passes through the first scan lens 105*ym*, is reflected by the redirecting mirror 107*m*1, passes through the second scan lens 106*m*, and is further reflected by the redirecting mirror 107*m*2. Thus, the light beam Lm scans the photosensitive member 90*m* at uniform velocity while being imaged thereon. The first scan lens 105*ym*, the second scan lens 106*m*, and the redirecting mirrors 107*m*1 and 107*m*2 are the optical components that constitute the second imaging optical system. The surface of the photosensitive member 90*m* corresponds to the second surface to be scanned.

When the optical path length of the imaging optical system illustrated in FIG. 2A is represented by T1*a* and the optical path length of the imaging optical system illustrated in FIG. 2B is represented by T1*b*, T1*a*>T1*b* holds true. In other words, in the present exemplary embodiment, the optical distance from the deflection point on the optical deflector 102 to the second surface to be scanned (the surface of the photosensitive member 90m) is shorter than the optical distance from the deflection point to the first surface to be scanned (the surface of the photosensitive member 90y). As the optical path lengths of the two scanning optical systems are made to differ from each other, the number of optical components is reduced. In order to provide an optical path length difference and to form an image that does not have a qualitative problem, the degrees of convergence, within the main scanning direction, of the light beams incident on the deflection surface of the rotatable polygon mirror 101 may be varied. Next, the degree of convergence will be described. The degree of convergence corresponds to the degree of convergence in the main scanning direction of a light beam incident on the deflection surface of the optical deflector, and the degree of convergence m can be derived as follows.

Specifically, $m=1-(Sk \div f)$, in which Sk represents the distance (mm) within the main scanning section from the rear principal plane of the imaging optical system to the surface to be scanned and f represents the focal length (mm) of the imaging optical system within the main scanning section. A situation in which $m=0$ corresponds to a case in which a parallel light beam is incident on the optical deflector within the main scanning direction. In addition, a situation in which $m<0$ corresponds to a case in which a divergent light beam is incident on the optical deflector within the main scanning direction. Furthermore, a situation in which $m>0$ corresponds to a case in which a convergent light beam is incident on the optical deflector within the main scanning direction. In the present exemplary embodiment, the optical scanning device is designed such that the degree of convergence m of the first incident optical system and the degree of convergence m of the second incident optical system are both equal to or greater than 0, and such that the degree of convergence m of the second incident optical system is greater than the degree of convergence m of the first incident optical system. To be more specific, in the present exemplary embodiment, the optical scanning device is designed such that the degree of convergence m is 0 in the Y station and the K station and a substantially parallel light beam is incident on the deflection surface (mirror surface of the rotatable polygon mirror 101) of the optical deflector 102. In addition, the optical scanning device is designed such that the degree of convergence m is greater than 0 in the M station and the C station and a convergent light beam is incident on the deflection surface of the optical deflector 102.

In addition, a synchronization detection sensor 115 configured to detect a beam write-start position is provided in a non-effective region defined by an optical path of a light beam incident on the rotatable polygon mirror 101 and an optical path of a scanning light beam (actual scanning light beam) deflected by the rotatable polygon mirror 101 and incident on the surface to be scanned. The write-start timings of a plurality of light beams emitted by the four semiconductor lasers 111y, 111m, 111c, and 111l are controlled by the synchronization detection sensor 115. In addition, a light beam traveling toward the synchronization detection sensor 115 passes through a write-start position detection lens 116 and travels along an optical path different from the optical path of the scanning light beam.

Figure 3:
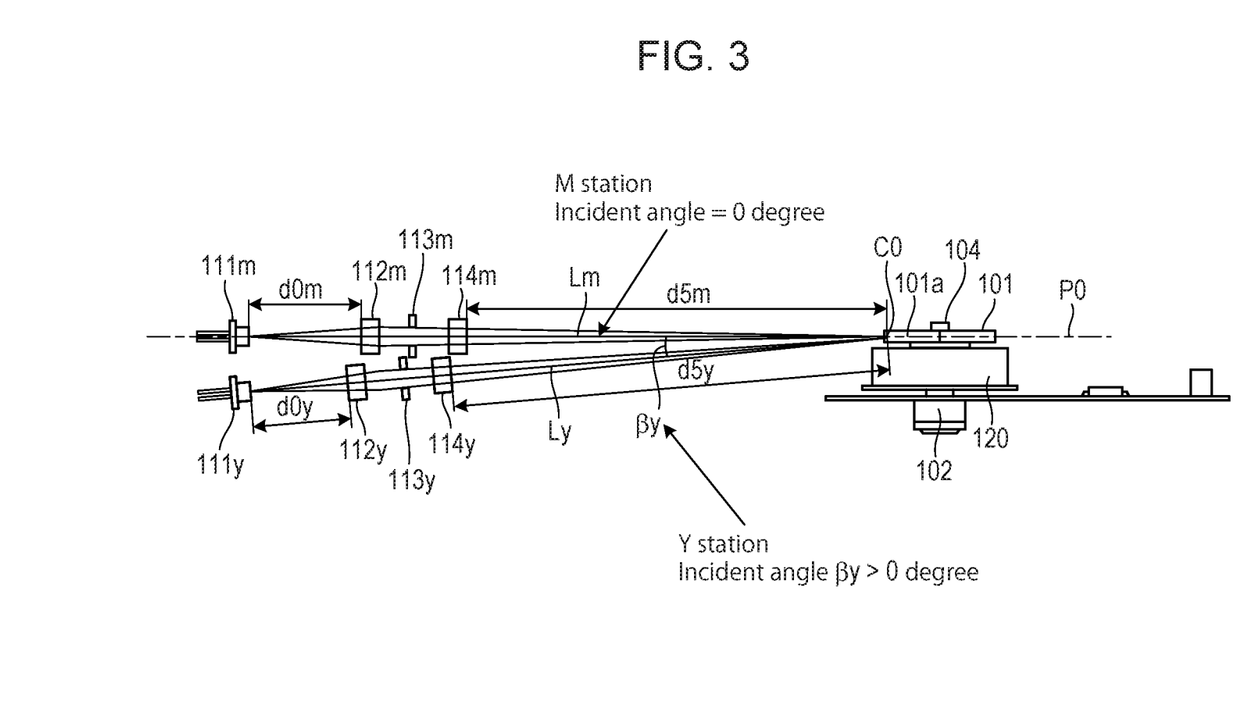
FIG. 3 is a sectional view of a primary portion of an incident optical system, taken within the sub-scanning direction, according to the first exemplary embodiment.

FIG. 3 is a sectional view (sub-scanning section) of a primary portion of the incident optical system of the optical scanning device according to the present exemplary embodiment. When a plane that is perpendicular to a deflection surface 101a of the rotatable polygon mirror 101 and that passes through the reference point C0 is represented by P0, the scanning light beam Lm in the M station is incident on the deflection surface 101a along a plane that substantially coincides with P0. In other words, in the present exemplary embodiment, the optical scanning device is designed such that the angle of incidence, within the sub-scanning section, of a light beam incident on the deflection surface 101a of the rotatable polygon mirror 101 in the optical deflector 102 from the second incident optical system is 0°. In addition, in the Y station, the scanning light beam Ly is incident on the deflection surface 101a at an angle of βy relative to P0. As one of the light beams is made incident at an angle of βy relative to P0, the optical paths can be separated with ease. In this manner, the angle of incidence, within the sub-scanning section, of the light beam (second light beam) incident on the deflection surface 101a of the optical deflector 102 from the second incident optical system (incident optical systems in the M and C stations) is smaller than the angle of incidence, within the sub-scanning section, of the light beam (first light beam) incident on the deflection surface 101a of the optical deflector 102 from the first incident optical system (incident optical systems in the Y and K stations).

In the present exemplary embodiment, the semiconductor lasers 111y and 111m are used as the light sources, and a divergent light beam emitted by the semiconductor laser 111y is collimated or converted to a weakly divergent light beam by the collimator lens 112y, which serves as an entrance imaging lens. In addition, a divergent light beam emitted by the semiconductor laser 111m is converted to a convergent light beam by the collimator lens 112m. Within the sub-scanning section, the light beams converged by the collimator lenses 112y and 112m are imaged on the deflection surface 101a of the rotatable polygon mirror 101 by the cylindrical lenses 114y and 114m, which serve as entrance imaging lenses. In addition, the aperture stops 113y and 113m have different diameters in the sub-scanning direction so that the spot sizes on the surface to be scanned of the corresponding photosensitive members 90y and 90m are equal to each other.

In addition, in the present exemplary embodiment, with regard to the optical components, except for the aperture stops 113y and 113m, constituting the optical systems (incident optical systems) from the semiconductor lasers 111y and 111m to the deflection surface 101a, optical components (entrance imaging lenses) having exactly identical shapes are used. In order to cause light beams with different degrees of convergence to be emitted by using the identical optical components, the distances d0y and d0m between the collimator lenses 112y and 112m and the respective semiconductor lasers 111y and 111m may be varied. In addition, in order to image the light beams with different degrees of convergence on the deflection surface 101a of the rotatable polygon mirror 101, the distances d5y and d5m between the cylindrical lenses 114y and 114m and the deflection surface 101a may be varied.

As described thus far, with the optical scanning device S1 according to the present exemplary embodiment, light beams emitted by a plurality of light sources are made incident on different deflection surfaces of the single rotatable polygon mirror 101 through the respective incident optical systems, and thus the four stations can be scanned simultaneously.

Subsequently, two types of jitter that occur in the scanning optical system for making a light beam incident on the deflection surface will be described. Specifically, in the scanning optical system, jitter caused as a light beam is made incident obliquely on the deflection surface and jitter caused as a convergent light beam is made incident on the deflection surface can occur. With regard to the former, it is known that the jitter occurs as a light source is made incident obliquely on the deflection surface by using, as a light source, a multi-beam light source with a plurality of luminous points. In this case, it is known that, due to a relative inclination of the deflection surface (face tangle error) in the sub-scanning direction, a scanning position shift (jitter) in the main scanning direction increases geometrically at a side where writing of an image ends. With regard to the latter, the jitter occurs in the main scanning direction due to a difference in the relative inclination of the deflection surface. This is a geometric phenomenon, and in a system in which a light beam is incident on the deflection surface, for example, at an angle from the lower side of the deflection surface, when the deflection surface is inclined in a tilt direction, the scanning position is shifted to a position toward the write-end side at the scan-end side, as compared to a case in which the deflection surface is not inclined. Meanwhile, when the deflection surface is inclined in a bowing direction, the scanning position is shifted to a position that is opposite to the write-end side at the scan-end side, as compared to a case in which the deflection surface is not inclined. In this manner, when there is a relative inclination of the deflection surface in a single rotatable polygon mirror, the scanning position differs depending on the deflection surface, and thus jitter in the main scanning direction occurs. It is to be noted that the tilt direction is the direction in which a light beam is incident on the deflection surface, and the bowing direction is the direction opposite to the tilt direction.

Therefore, in the scanning optical system in which a convergent light beam is made incident obliquely on the deflection surface, the above-described two types of jitter are superposed on each other, and the jitter is likely to increase. Thus, as the angle of incidence, within the sub-scanning section, of a convergent light beam incident on the deflection surface is reduced, the jitter can be suppressed. In the optical scanning device S1 according to the present exemplary embodiment, as described above, a convergent light beam is made incident on the deflection surface at substantially normally, and an occurrence of jitter arising due to oblique incidence is being suppressed. However, a convergent light beam does not necessarily have to be made incident on the deflection surface normally. As described above, as the angle of incidence on the deflection surface is reduced, the jitter can be suppressed.

Typically, in a case of an optical scanning device in which scanning optical systems are disposed closely to the respective sides of a single optical deflector and a plurality of light beams are deflected, flare light (surface reflection light) between the imaging optical systems facing the optical deflector 102 becomes a problem on an image. The flare light refers to, of a light beam reflected by the lens surface of the imaging lens system facing the optical deflector 102, unwanted light that is incident on a photosensitive member. If a light beam is made incident obliquely on the rotatable polygon mirror 101 from the upper side in FIG. 1, part of the light beam is reflected while passing through the entry surface of the first scan lens 105ym and results in flare light. The reflected flare light passes through a space between the rotatable polygon mirror 101 and a rotor frame 120 that rotates along with the rotatable polygon mirror 101, and is reflected by the top surface of the metal rotor frame 120 so as to travel toward the first scan lens 105ck. The flare light that has passed through the first scan lens 105ck then passes through the second scan lens 106k, is reflected by the redirecting mirror 107k1, and reaches the photosensitive member 90k. This is likely to occur primarily in an optical system in which a light beam is incident obliquely on the rotatable polygon mirror 101 from the upper side in the sub-scanning direction.

In the case of the present exemplary embodiment, light beams that are incident on the rotatable polygon mirror 101 include only a light beam that is incident normally along the sub-scanning direction and a light beam that is incident obliquely from the lower side (refer to FIG. 3). In other words, in the present exemplary embodiment, the light beam from the first incident optical system is incident on the deflection surface 101a of the rotatable polygon mirror 101 from the side of the rotor frame 120. Therefore, flare light reflected by the entry surface of the first scan lens 105ym is not reflected toward the rotor frame 120. Accordingly, flare light does not become an issue.

Second Exemplary Embodiment

Figure 4:
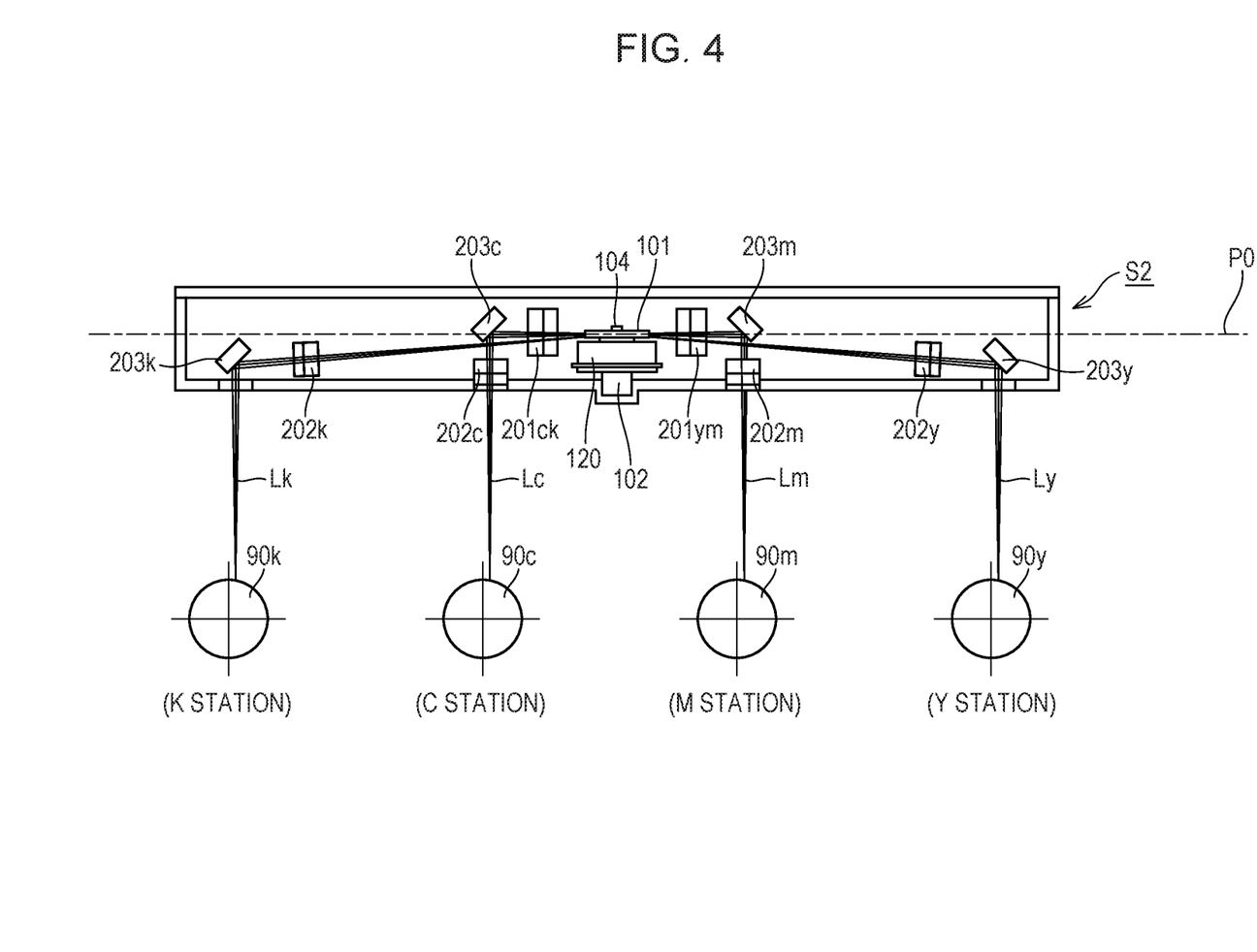
FIG. 4 is a sectional view of a primary portion of an optical scanning device, taken within the sub-scanning direction, according to a second exemplary embodiment.
Figure 5A:
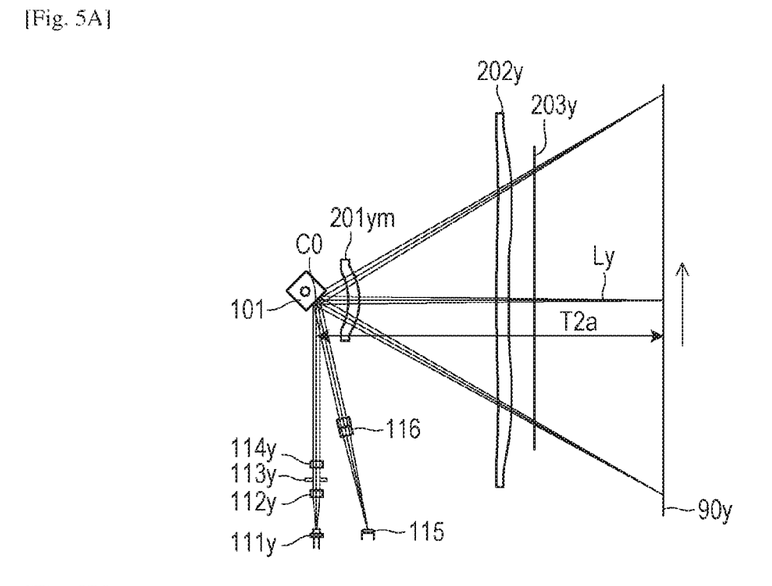
FIG. 5A is a sectional view of a primary portion of the optical scanning device, taken within the main scanning direction, according to the second exemplary embodiment.
Figure 5B:
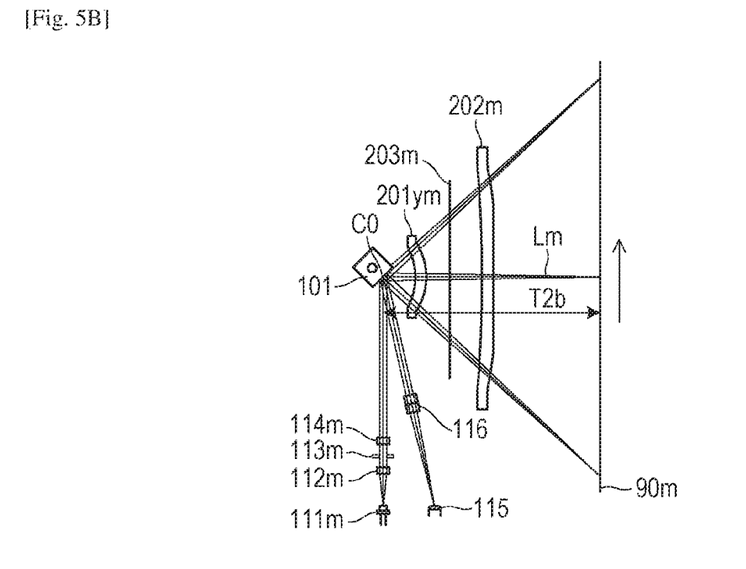
FIG. 5B is another sectional view of a primary portion of the optical scanning device, taken within the main scanning direction, according to the second exemplary embodiment.

FIGS. 4, 5A, and 5B illustrate a second exemplary embodiment of the present invention. In the present exemplary embodiment, a configuration in which, with respect to the configuration illustrated in the first exemplary embodiment above, the scanning directions of the light beams in the sub-scanning direction are vertically reversed, the number of times the light beams are redirected is reduced, and the number of redirecting mirrors is reduced will be described. Other basic configurations and operations are identical to those of the first exemplary embodiment. Thus, identical components are given identical reference characters, and descriptions thereof will be omitted as appropriate.

FIG. 4 is a sub-scanning section of an optical scanning device according to the second exemplary embodiment of the present invention. In an optical scanning device S2 according to the present exemplary embodiment as well, as in the first exemplary embodiment described above, a first scanning optical system is provided on one side (right side in FIG. 4) of the rotation shaft 104 of the optical deflector 102, and a second scanning optical system is provided on the other side (left side in FIG. 4) of the rotation shaft 104. In addition, the first scanning optical system (Y station and M station) and the second scanning optical system (C station and K station) have similar configurations. The configurations of the Y station and the K station are substantially symmetrical with respect to the center of the rotation shaft 104 of the optical deflector 102, and the configurations of the M station and the C station are substantially symmetrical with respect to the center of the rotation shaft 104.

The first scanning optical system includes a first scan lens 201ym, second scan lenses 202y and 202m, and redirecting mirrors 203y and 203m. In addition, the second scanning optical system includes a first scan lens 201ck, second scan lenses 202c and 202k, and redirecting mirrors 203c and 203k. The first scanning optical system and the second scanning optical system each scan two separate light beams. As in the case of the first exemplary embodiment described above, the various parts of optical components constituting the first scanning optical system and the arrangement and optical effect of these optical components are basically identical to the various parts of optical components constituting the second scanning optical system and the arrangement and optical effect of these optical components.

The first scan lens 201ym is shared by the Y station and the M station, and the second scan lenses 202y and 202m are provided, respectively, in the Y station and the M station. In addition, these second scan lenses 202y and 202m have different shapes within the main scanning section and the sub-scanning section.

FIGS. 5A and 5B are sectional views (main scanning sections) of a primary portion of the optical scanning device according to the present exemplary embodiment, FIG. 5A is a main scanning section of the Y station. In the present exemplary embodiment as well, the first incident optical system and the first imaging optical system are provided in each of the station and the K station. The optical components constituting the first incident optical system and the functions and roles of these optical components are similar to those of the first exemplary embodiment described above. The optical components constituting the first imaging optical system in the Y station according to the present exemplary embodiment include the first scan lens 201ym, the second scan lens 202y, and the redirecting mirror 203y.

FIG. 5B is a main scanning section of the M station. In the present exemplary embodiment as well, the second incident optical system and the second imaging optical system are provided in each of the M station and the C station. The optical components constituting the second incident optical system and the functions and roles of these optical components are similar to those of the first exemplary embodiment described above. The optical components constituting the second imaging optical system in the M station according to the present exemplary embodiment include the first scan lens 201ym, the second scan lens 202m, and the redirecting mirror 203m.

When the optical path length of the imaging optical system in the Y station is represented by T2a and the optical path length of the imaging optical system in the M station is represented by T2b, T2a>T2b holds true. In order to provide an optical path length difference in this manner and to form an image that does not have a qualitative problem, the degrees of convergence, along the main scanning direction, of the light beams incident on the deflection surface of the rotatable polygon mirror 101 are varied, and the shapes of the second scan lenses 202y and 202m are varied. Through this configuration, a desired spot shape can be obtained on the scanning surface, and the scanning at uniform velocity can be achieved. The first incident optical system is designed such that the degree of convergence m is 0, and the second incident optical system is designed such that the degree of convergence m is greater than 0. These features are similar to those in the first exemplary embodiment described above. In addition, in the present exemplary embodiment as well, the angle of incidence, within the sub-scanning section, of a light beam incident on a deflection surface of the optical deflector from the second incident optical system is less than the angle of incidence, within the sub-scanning section, of a light beam incident on a deflection surface of the optical deflector from the first incident optical system. Furthermore, in the present exemplary embodiment as well, the optical scanning device is designed such that the angle of incidence, within the sub-scanning section, of a light beam incident on the deflection surface of the optical deflector from the second incident optical system is 0°.

According to the present exemplary embodiment, in an optical path for scanning a scanning surface disposed at a position closest to the optical deflector, the number of optical components, such as a redirecting mirror, can be reduced, and the size of the optical scanning device can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-156454, filed Jul. 31, 2014, which is hereby incorporated by reference herein in its entirety.

REFERENCE SIGNS LIST

S1 Optical scanning device
90 Photosensitive member
L Light beam
102 Optical deflector
105ym, 105ck First scan lenses
106y, 106m, 106c, 106k Second scan lenses
107y1, 107m1, 107m2, 107c1, 107c2, 107k1 Redirecting mirrors
111y, 111m, 111c, 111k Semiconductor lasers
112y, 112m, 112c, 112k Collimator lenses
113y, 113m, 113c, 113k Aperture stops
114y, 114m, 114c, 114k Cylindrical lenses

The invention claimed is:

1. An optical scanning device, comprising:
a first light source;
a first incident optical system provided so as to correspond to a first light beam emitted by the first light source;
a second light source;
a second incident optical system provided so as to correspond to a second light beam emitted by the second light source;
an optical deflector disposed such that the first light beam from the first incident optical system and the second light beam from the second incident optical system are incident on the optical deflector;
a first imaging optical system configured to image the first light beam deflected by the optical deflector on a first surface to be scanned; and
a second imaging optical system configured to image the second light beam deflected by the optical deflector on a second surface to be scanned,
wherein, when a degree of convergence is expressed as $\{1-(Sk \div f)\}$, in which Sk represents distance, within a main scanning section, from a rear principal plane of the first or second imaging optical system to the corresponding first or second surface to be scanned, and f represents focal length of the first or second imaging optical system within the main scanning section,
the degree of convergence of the first incident optical system is equal to or greater than 0, and the degree of convergence of the second incident optical system is greater than the degree of convergence of the first incident optical system, and
wherein an angle of incidence, within a sub-scanning section, of the second light beam incident on a deflection surface of the optical deflector from the second incident optical system is less than an angle of incidence, within the sub-scanning section, of the first light beam incident on the deflection surface of the optical deflector from the first incident optical system.

2. The optical scanning device according to claim 1, wherein an optical distance from a deflection point on the optical deflector to the second surface to be scanned is shorter than an optical distance from the deflection point to the first surface to be scanned.

3. The optical scanning device according to claim 1,
wherein the optical scanning device is designed such that the angle of incidence, within the sub-scanning section, of the second light beam incident on the deflection surface of the optical deflector from the second incident optical system is 0°.

4. The optical scanning device according to claim 1,
wherein the optical scanning device is designed such that the degree of convergence of the first incident optical system is 0.

5. The optical scanning device according to claim 1,
wherein the optical deflector includes a rotatable polygon mirror and a rotor frame configured to rotate with the rotatable polygon mirror, and the first light beam from the first incident optical system is incident on a deflection surface of the rotatable polygon mirror from a side where the rotor frame is provided.

6. An image forming apparatus, comprising:
the optical scanning device according to claim 1; and
an image forming unit configured to scan a surface to be scanned on an image carrier by using the optical scanning device and to form an image on a recording material on the basis of a scanned image.

\* \* \* \* \*